United States Patent
Bhatt et al.

(10) Patent No.: US 10,430,407 B2
(45) Date of Patent: Oct. 1, 2019

(54) GENERATING STRUCTURED QUERIES FROM NATURAL LANGUAGE TEXT

(71) Applicant: International Business Machines Corporation, Armonk, NY (US)

(72) Inventors: Dhruv A. Bhatt, Indian Trail, NC (US); David B. Werts, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 14/956,450

(22) Filed: Dec. 2, 2015

(65) Prior Publication Data

US 2017/0161262 A1   Jun. 8, 2017

(51) Int. Cl.
*G06F 16/2452* (2019.01)
*G06F 17/27* (2006.01)
*G06F 17/24* (2006.01)

(52) U.S. Cl.
CPC ........ *G06F 16/24522* (2019.01); *G06F 17/27* (2013.01); *G06F 17/2765* (2013.01); *G06F 17/241* (2013.01)

(58) Field of Classification Search
CPC ............................ G06F 17/3043; G06F 17/241
See application file for complete search history.

(56) References Cited

U.S. PATENT DOCUMENTS

| | | | |
|---|---|---|---|
| 5,764,973 A * | 6/1998 | Lunceford | G06F 17/30392 |
| 6,430,552 B1 | 8/2002 | Corston-Oliver | |
| 7,310,642 B2 | 12/2007 | McConnell et al. | |
| 9,367,607 B2 * | 6/2016 | Vee | G06F 17/3043 |
| 9,594,852 B2 * | 3/2017 | Li | G06F 17/30958 |
| 2002/0052740 A1 * | 5/2002 | Charlesworth | G06F 17/30038 704/220 |
| 2003/0018632 A1 * | 1/2003 | Bays | G06F 17/241 |
| 2003/0078766 A1 | 4/2003 | Appelt et al. | |
| 2003/0115192 A1 | 6/2003 | Kil et al. | |
| 2008/0235199 A1 * | 9/2008 | Li | G06F 17/30401 |
| 2009/0112835 A1 | 4/2009 | Elder | |
| 2009/0276419 A1 | 11/2009 | Jones et al. | |
| 2010/0063968 A1 | 3/2010 | Sheu et al. | |
| 2013/0262123 A1 | 10/2013 | Boukadakis | |

(Continued)

OTHER PUBLICATIONS

Oasis, "Unstructured Information Management Architecture (UIMA) Version 1.0," UIMA 2008.*

*Primary Examiner* — Feng-Tzer Tzeng
(74) *Attorney, Agent, or Firm* — Cuenot, Forsythe & Kim, LLC

(57) ABSTRACT

Generating structured queries from natural language text may include receiving, using a processor, a natural language text input directed to a database management system and, using the processor, performing natural language processing on the natural language text input using an Unstructured Information Management Architecture. The natural language processing may annotate the natural language text input according to a structure of the database management system. A database operation and query elements may be determined using a processor from the annotated natural language text input. A structured query may be created, using the processor, for the database management system that implements the database operation using the query elements.

18 Claims, 3 Drawing Sheets

(56) References Cited

U.S. PATENT DOCUMENTS

2014/0201241 A1 7/2014 Wood et al.
2015/0039292 A1 2/2015 Suleman et al.
2015/0193583 A1 7/2015 McNair et al.
2017/0075953 A1* 3/2017 Bozkaya ........... G06F 17/30401

* cited by examiner

GENERATING STRUCTURED QUERIES FROM NATURAL LANGUAGE TEXT

BACKGROUND

This disclosure relates to generating queries and, more particularly, to generating structured queries from natural language text. Many modern computer-based systems utilize an information management system such as a database management system or a relational database management system. A database management system refers to an ordered collection of data that may include objects such as schemas, tables, structured queries, reports, and the like. A structured query refers to a precise request for information from an information management system. Typically, structured queries are specified using a programming language such as Structure Query Language (SQL). SQL is a specialized programming language that is designed for managing data stored within an information management system such as a database.

SUMMARY

An embodiment of the present invention may include a method. The method may include receiving, using a processor, a natural language text input directed to a database management system and, using the processor, performing natural language processing on the natural language text input using an Unstructured Information Management Architecture. The natural language processing may annotate the natural language text input according to a structure of the database management system. The method may include determining, using the processor, a database operation and query elements from the annotated natural language text input. The method may also include creating, using the processor, a structured query for the database management system that implements the database operation using the query elements.

Another embodiment of the present invention may include a system having a processor programmed to initiate executable operations. The executable operations may include receiving a natural language text input directed to a database management system and performing natural language processing on the natural language text input using an Unstructured Information Management Architecture. The natural language processing may annotate the natural language text input according to a structure of the database management system. The executable operations may include determining a database operation and query elements from the annotated natural language text input according to a structure of the database management system. The executable operations may also include creating a structured query for the database management system that implements the database operation using the query elements.

Another embodiment of the present invention may include a computer program product including a computer readable storage medium having program code stored thereon. The program code is executable by a processor to perform a method. The method may include receiving, using a processor, a natural language text input directed to a database management system and, using the processor, performing natural language processing on the natural language text input using an Unstructured Information Management Architecture. The natural language processing may annotate the natural language text input according to a structure of the database management system. The method may include determining, using the processor, a database operation and query elements from the annotated natural language text input. The method may also include creating, using the processor, a structured query for the database management system that implements the database operation using the query elements.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to generating queries and, more particularly, to generating structured queries from natural language text. In accordance with the inventive arrangements disclosed herein, natural language text may be received and operated upon to generate a structured query for a database management system. In one arrangement, the natural language text may be directed to a particular database management system to request information. The natural language text may be expressed as free form or unstructured text. The natural language text input may be analyzed to determine intended operations and/or query elements for the database management system. Further, a structured query may be generated from the natural language text to implement the determined operation using the query elements. The structured query may be used to access the database management system.

Figure 1:
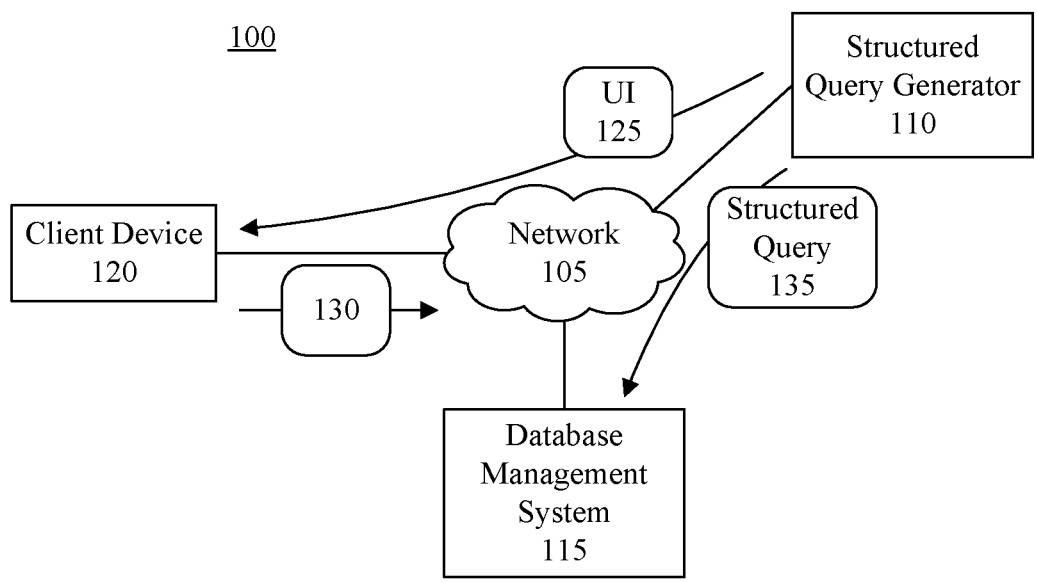
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communication links between various devices and data processing systems connected together within network computing system 100. Network 105 may include connections, such as wired communication links, wireless communication links, or fiber optic cables. Network 105 may be implemented as, or include, any of a variety of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), or the like.

In the depicted example, a structured query generator 110 and is coupled to network 105. Further, a database management system (DMS) 115 and a client device (client) 120 are coupled to network 105. Client 120 may be, for example, a personal computer, a portable device, a network computer, a tablet computer, a mobile phone, or the like. Structured query generator 110 may be implemented as a data processing system, e.g., server, or as a plurality of interconnected data processing systems. DMS 115 may be implemented as a data processing system such as a server or as a plurality of interconnected data processing systems. Structured query generator 110 may be configured to receive natural language text input and generate a structured query from the received input. The structured query that is generated may be used to access DMS 115.

For purposes of illustration, consider an example where a user of client 120 wishes to access DMS 115. DMS 115 may be a relational database management system. Accordingly, information may be retrieved from DMS 115 using structured queries. In one example, the structured queries used to access DMS 115 may be specified using a programming language such as Structured Query Language (SQL). The user of client 120 may not have sufficient knowledge to formulate a structured query that may be submitted to DMS 115.

In accordance with the inventive arrangements described within this disclosure, client 120 may access structured query generator 110. For example, structured query generator 110 may be implemented as a "front-end" or preprocessor for DMS 115 that may be accessed by clients to generate structured queries from natural language text inputs. In the example shown in FIG. 1, client 120 accesses structured query generator 110. For example, client 120 may execute a client application that is configured to communicate with structured query generator 110. The client application may be a browser or other client-based communications application.

Responsive to access by client 120, structured query generator 110 may generate a user interface (UI) 125 that may be sent to client 120. In one example, UI 125 may be a Webpage. Client 120 may render UI 120. The user of client 120 may enter natural language text as input through UI 120, e.g., using a text entry field of UI 120. Client 120 may sent the natural language text, shown as element 130, to structured query generator 110. As defined within this disclosure, the term "natural language text" or "natural language text input" is unstructured textual data that does not have a pre-defined data model or is not organized in a pre-defined manner. Natural language text refers to "free form" text.

Structured query generator 110 operates on natural language text 130 and generates structured query 135. Structured query 135 may be specified using SQL or another database programming language. In one arrangement, structured query generator 110 may perform Natural Language Processing (NLP) on natural language text 130. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

As pictured, structured query generator 110 may submit structured query 135 to DMS 115 for execution. DMS 115 may return a result, responsive to execution of structured query 135. In one aspect, DMS 115 may provide the result to structured query generator 110, which may then send the result to client 120. In another aspect, DMS 115 may send the result directly to client 120 without first sending the result to structured query generator 110.

FIG. 1 is provided for purposes of illustration and is not intended to limit the inventive arrangements described herein. It should be appreciated that network computing system 100 may include fewer elements than shown or more elements than shown such as additional servers, clients, and other devices.

In one exemplary arrangement, structured query generator 110 may be implemented using the Unstructured Information Management Architecture (UIMA) framework. UIMA is an open framework for building analytic applications. In one aspect, structured query generator 110 may implement an architecture compliant with the UIMA specification maintained as an OASIS (Organization for the Advancement of Structured Information Standards) Standard. Accordingly, structured query generator 110 may include a plurality of annotators that tag, or annotate, natural language text received as input. The annotators may be arranged in a pipeline format, e.g., serially, to progressively determine increasingly complex contexts. The annotators may utilize a Common Analysis Structure (CAS) to facilitate operation of the annotators in the pipeline.

The CAS is an object-based container that manages and stores typed objects having properties and values generated by the annotators. Object types may be related to each other in a single-inheritance hierarchy. Annotators are given a CAS having the subject of analysis (the natural language text) in addition to any previously created objects (from annotators earlier in the pipeline). Each annotator may add objects to the CAS. Accordingly, the CAS serves as a common data object, shared among the annotators that are assembled for generation of a structured query from the natural language text.

In one example, structured query generator 110 may include annotators that are configured to perform operations such as language identification (e.g., whether the natural language text is in English, Spanish, French, etc.), followed by language specific segmentation (e.g., part of speech analysis and identification), followed by sentence boundary detection, entity detection, named entity detection, and the like. The annotators, using the CAS, may utilize standoff annotations that maybe kept separate from the original natural language text. As defined within this specification, the term "annotator" means a software component implemented to produce and record annotations over regions of natural language text and/or annotations generated by prior annotators in a pipeline.

In another arrangement, structured query generator 110 may include one or more additional annotators that are configured to determine database management system operations from natural language text. As defined herein, the term "database management system operation" or "database operation" means a create, read, update, or delete (CRUD) operation for the database management system. Further, structured query generator 110 may include one or more additional annotators that are configured to annotate text with tables of the database management system, columns of the database management system, SQL elements, and/or arguments.

Figure 2:
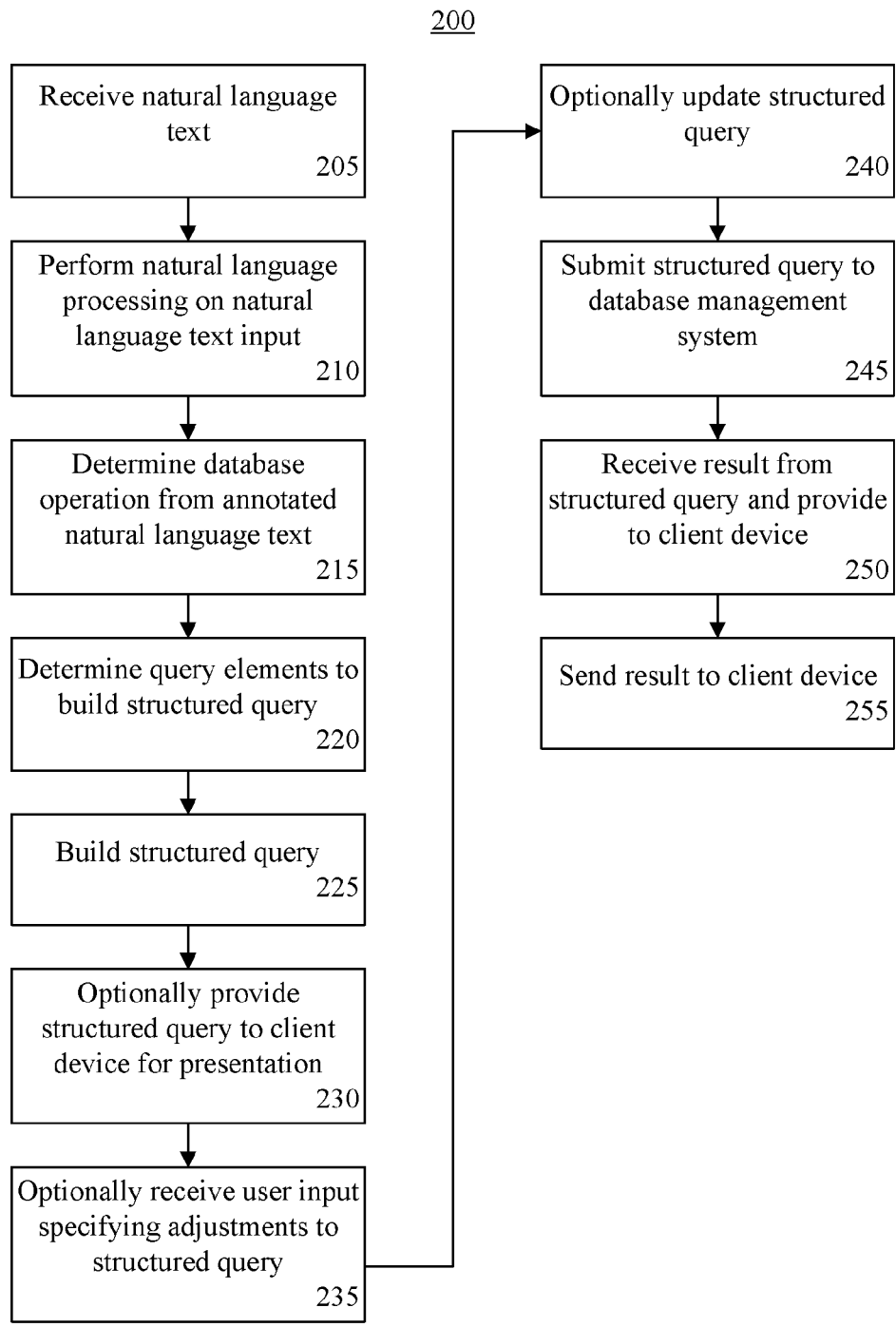
FIG. 2 is a flow chart illustrating an exemplary method of structured query generation.

FIG. 2 is a flow chart illustrating an exemplary method 200 of structured query generation. Method 200 may be performed by structured query generator 110 of FIG. 1 and is referred to in describing FIG. 2 as "the system." Method 200 may begin in a state where a user, utilizing a client device, has accessed the system. The system may have provided a UI to the client device. Accordingly, the user has entered natural language text into the UI. The client device sends the natural language text to the system for processing and query generation. The natural language text may be a natural language query that is intended to be directed to a particular DMS. The user of the client device, for example, may expect to receive results or search results based upon the natural language text.

In block 205, the system may receive the natural language text. As an illustrative example, the DMS may be a medical records management DMS. The natural language text received from the client may be a request for particular medical records. For example, the natural language text may be "give me all of the male patients we've recently seen that exhibit borderline hypertension in addition to a family history of diabetes mellitus."

In block 210, the system may perform natural language processing on the received natural language text. The system may perform NLP on the natural language text using text analytics as described herein. For example, the system may process the natural language text through one or more annotators using a UIMA framework as described.

The system, in addition to using generalized NLP annotators as previously described, may include one or more annotators tailored to the structure of the particular DMS to which the received natural language text inputs are directed. The system, for example, may be programmed with knowledge of the structure of the DMS. For example, the system may include annotators configured to annotate the natural language text with objects of the DMS including, but not limited to, tables, columns, and the like based upon the known structure of the DMS, e.g., as defined in the schema of the DMS.

The annotators may include dictionaries and parsing rules for tagging portions of text within the natural language text. For example, each annotator may include only a single dictionary without parsing rules, a plurality of dictionaries without parsing rules, a single parsing rule without any dictionaries, a plurality of parsing rules without any dictionaries, and/or any combination of one or more parsing rules and one or more dictionaries.

As an illustrative example, the system may process the natural language text using table annotators configured to annotate particular portions of the natural language text with tables of the DMS. As an example, the system may determine that the natural language text is searching for "patients" and, as such, determine that the "patient_table" will be accessed. The system further may determine that access to the "lab_table" is required due to the detection of lab-related terms such as "hypertension".

The system may process the natural language text using column annotators configured to annotate particular portions of the natural language text with columns of the DMS. For example, the system may determine particular columns of the "patient_table" that need to be accessed such as the first name, last name, and patient number. These columns may be used to uniquely identify patients that are found within the DMS. The system may determine relevant columns of the "lab_table" referenced by the text "hypertension". For example, the system may determine that "hypertension" indicates the "lab_table. systolic_value" column and/or the "lab_table.diastolic_value" column of the "lab_table" corresponding to blood pressure. The "family history" portion of text may be correlated with a large text field of the database that stores free form text in which the system may search for occurrence of the term "diabetes".

In block 215, the system may determine a database operation from the annotated natural language text. In one arrangement, the system may determine an operation such as "create," "read," "update," or "delete" from the annotated natural language text. In the example above, the system may determine that the operation is a read operation. For example, the system may determine, based upon the annotations specifying semantic meaning of the text, whether the natural language text input is requesting the creation or addition of information to the DMS (create), the retrieval or access of information from the DMS (read), the modification or change to information in the DMS (update), or the removal of information from the DMS (delete). Continuing with the prior example, the system may determine that the natural language text is requesting information from the DMS, which is interpreted as a read operation. The system may annotate particular words and/or phrases such as "give me" as a "request". The "request" annotation may be interpreted by the system as indicating a "read" operation.

In block 220, the system may further process the annotated natural language text to determine query elements necessary to build the structured query. Query elements may include, but are not limited to, database programming language (e.g., SQL) elements and constraints. In one example, the system may determine particular SQL elements necessary to implement the read operation determined in block 215. As used herein, the term "query element" means an element determined or derived from a natural language text input that is directly included in the structured query generated from interpreting the natural language text input.

For example, given the annotations specifying tables, columns, and constraints (e.g., the DMS structure as mapped onto the natural language text), the system may determine particular SQL elements needed to access the DMS objects. For example, the system may determine that the "FROM" SQL element is needed to indicate particular tables, the "SELECT" SQL element (e.g., statement) is needed to access particular columns of tables, the "WHERE" SQL element (e.g., clause) is need to impose constraints on locating records within particular tables, and/or the "AND" and/or "OR" SQL elements (e.g., operators) are needed to define the relationship between the constraints within the "WHERE" clause.

The system may process the natural language text to identify constraints from the natural language text to be used in accessing the tables and columns. The system may determine constraints to be used in the structured query that is to be generated. For example, within the natural language text, the system may annotate constraints such as "male". Further, the system may determine that the word "hypertension", when preceded by "borderline" indicates a constraint of a systolic blood pressure value between 130 and 140; or a diastolic blood pressure value between 80 and 90.

In block 225, the system may build a structured query for the natural language text. The structured query may be a valid, e.g., syntactically correct, structured query that compiles with a selected database programming language such as SQL or the like.

Example 1 illustrates an exemplary structured query that may be generated for the natural language text "give me all of the male patients we've recently seen that exhibit borderline hypertension in addition to a family history of diabetes mellitus." Example 1 is formatted using SQL for purposes of illustration.

Example 1

```
SELECT
patient_table.last_name,
patient_table.first_name,
patient_table.medical_record_number
FROM
patient_table
WHERE
((lab_table.systolic_value >= 130 AND lab_table.systolic_value <=
140) OR
(lab_table.diastolic_value >= 80 AND lab_table.systolic_value <= 90))
AND
family_history.text CONTAINS "diabetes" AND
patient_table.gender = "M" AND
lab_table.test_date > 20141111 AND
lab_table.medical_record_number =
patient_table.medical_record_number
```

In Example 1, the system creates the "FROM" SQL element with the argument of "patient_table". The system includes the "SELECT" SQL element in reference to the columns of "patient.last_name", "patient_table.first_name", and "patient_table. medical_record_number". The system includes the "WHERE" SQL element to specify constraints and includes operators such as "CONTAINS", "AND" and "OR" between the various constraints to impose the constraints thereby filtering the records that are returned.

In block 230, the system may optionally provide the structured query to the client device of the user for presentation. For example, the system may send the structured query to the user's client device. The client device may present, e.g., display, the structured query through the UI. In block 235, the system may optionally receive user input specifying adjustments to the structured query. In block 240, the system may optionally update the structured query. For example, the system may make the user specified adjustments, e.g., edits, to the structured query.

In block 245, the system may submit the structured query to the DMS. Responsive to receiving the structured query, the DMS may execute the structure query to determine a result. In block 250, the system may receive the result from the DMS. In block 255, the system may send the result to the client device of the user for presentation.

Figure 3:
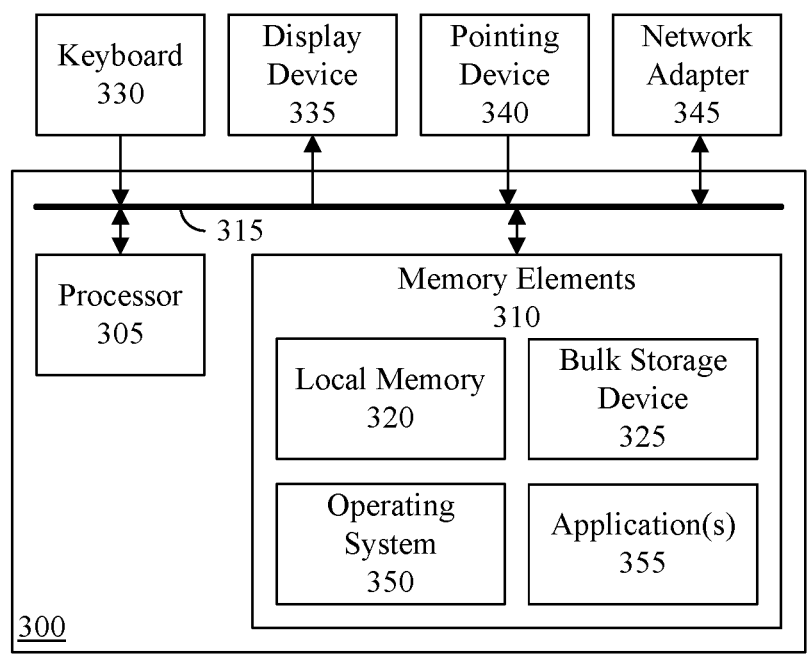
FIG. 3 is a block diagram illustrating an exemplary architecture for a data processing system.

FIG. 3 is a block diagram illustrating an exemplary architecture 300 for a data processing system. Architecture 300 may be used to implement a computer that is suitable for storing and/or executing program code. In one aspect, for example, architecture 300 may be used to implement structured query generator 110 of FIG. 1.

Architecture 300 includes at least one processor 305, e.g., a central processing unit (CPU), coupled to memory elements 310 through a system bus 315 or other suitable circuitry. Architecture 300 stores program code within memory elements 310. Processor 305 executes the program code accessed from memory elements 310 via system bus 315. In one aspect, architecture 300 may be used to implement a computer or other data processing system that is suitable for storing and/or executing program code. It should be appreciated, however, that architecture 300 may be used to implement any system including a processor and memory that is capable of performing the functions described within this disclosure.

Memory elements 310 include one or more physical memory devices such as, for example, a local memory 320 and one or more bulk storage devices 325. Local memory 320 may be implemented as a random access memory (RAM) or other non-persistent memory device(s) generally used during actual execution of the program code. Bulk storage device 335 may be implemented as a hard disk drive (HDD), solid state drive (SSD), or other persistent data storage device. Architecture 300 also may include one or more cache memories (not shown) that provide temporary storage of at least some program code in order to reduce the number of times program code must be retrieved from the bulk storage device during execution.

Input/output (I/O) devices such as a keyboard 330, a display device 335, and a pointing device 340 optionally may be coupled to architecture 300. The I/O devices may be coupled to architecture 300 either directly or through intervening I/O controllers. A network adapter 345 may also be coupled to architecture 300 to enable a system implemented using architecture 300 to become coupled to other systems, computer systems, remote printers, and/or remote storage devices through intervening private or public networks. Modems, cable modems, Ethernet cards, and wireless transceivers are examples of different types of network adapter 345 that may be used with architecture 300.

Memory elements 310 store an operating system 350 and an application 355. Operating system and application 355, being implemented in the form of executable program code, are executed by architecture 300. Operating system 350 may be a server-side operating system; and, application 355 may be a server-side application that, when executed, causes the server to perform the various operations described herein. As such, operating system 350 and/or application 355 may be considered an integrated part of any system implemented using architecture 300. Application 355 and any data items used, generated, and/or operated upon by architecture 300 while executing application 355 are functional data structures that impart functionality when employed as part of architecture 300.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a natural language text input directed to a database management system;
    performing natural language processing on the natural language text input by annotating the natural language text input with annotations that are based upon a query structure of the database management system, including constraint annotations, table annotations and column annotations;
    determining, from the annotations, a database operation selected from the group consisting of a create, a read, an update, and a delete operation; and
    determining, from the annotations, query elements including Structured Query Language (SQL) elements and constraints, and
    creating, using the query elements, a structured query that implements the database operation on the database management system.

2. The method of claim 1, wherein:
    the database management system is accessed using the structured query.

3. The method of claim 1, wherein
    the performing natural language processing includes analyzing the natural language text input using a plurality of annotators.

4. The method of claim 1, wherein
the structured query is specified in Structured Query Language.

5. The method of claim 1, wherein
the performing natural language processing includes:
   determining a table of the database management system from the natural language text input using a table annotator; and
   determining a column of the table of the database management system using a column annotator.

6. The method of claim 5, wherein
the determining the database operation and query elements includes:
   determining the Structured Query Language elements for the structured query according to the table and the column.

7. A computer hardware system, comprising:
a hardware processor programmed to initiate the following executable operations:
   receiving a natural language text input directed to a database management system;
   performing natural language processing on the natural language text input by annotating the natural language text input with annotations that are based upon a query structure of the database management system, including constraint annotations, table annotations and column annotations;
   determining, from the annotations, a database operation selected from the group consisting of a create, a read, an update, and a delete operation; and
   determining, from the annotations, query elements including Structured Query Language (SQL) elements and constraints, and
   creating, using the query elements, a structured query that implements the database operation on the database management system.

8. The system of claim 7, wherein:
the database management system is accessed using the structured query.

9. The system of claim 7, wherein
the performing natural language processing includes analyzing the natural language text input using a plurality of annotators.

10. The system of claim 7, wherein
the structured query is specified in Structured Query Language.

11. The system of claim 7, wherein
the performing natural language processing includes:
   determining a table of the database management system from the natural language text input using a table annotator; and
   determining a column of the table of the database management system using a column annotator.

12. The system of claim 11, wherein
the determining the database operation and query elements includes:
   determining the Structured Query Language elements for the structured query according to the table and the column.

13. A computer program product, comprising:
a computer readable storage medium having program code stored thereon,
the program code executable by a computer hardware system to perform:
   receiving a natural language text input directed to a database management system;
   performing natural language processing on the natural language text input by annotating the natural language text input with annotations that are based upon a query structure of the database management system, including constraint annotations, table annotations and column annotations;
   determining, from the annotations, a database operation selected from the group consisting of a create, a read, an update, and a delete operation; and
   determining, from the annotations, query elements including Structured Query Language (SQL) elements and constraints, and
   creating, using the query elements, a structured query that implements the database operation on the database management system.

14. The computer program product of claim 13, wherein:
the database management system is accessed using the structured query.

15. The computer program product of claim 13, wherein
the performing natural language processing includes analyzing the natural language text input using a plurality of annotators.

16. The computer program product of claim 13, wherein
the structured query is specified in Structured Query Language.

17. The computer program product of claim 13, wherein
the performing natural language processing includes:
   determining a table of the database management system from the natural language text input using a table annotator; and
   determining a column of the table of the database management system using a column annotator.

18. The computer program product of claim 17, wherein
the determining the database operation and query elements includes:
determining the Structured Query Language elements for the structured query according to the table and the column.

* * * * *